G. G. Hickman,
Bolt Washer.
N°57,132.   Patented Aug. 14, 1866.
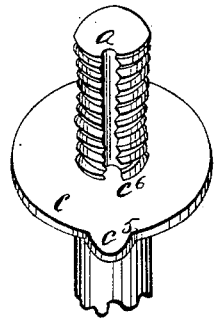

UNITED STATES PATENT OFFICE.

GIBBONS G. HICKMAN, OF COATESVILLE, PENNSYLVANIA.

IMPROVEMENT IN WASHERS FOR BOLTS.

Specification forming part of Letters Patent No. 57,132, dated August 14, 1866.

*To all whom it may concern:*

Be it known that I, GIBBONS G. HICKMAN, of Coatesville, in the county of Chester and State of Pennsylvania, have made a new and useful Improved Washer for Bolts; and I do hereby declare the following to be a full, clear, and exact description of the nature, construction, and operation of the same, sufficient to enable one skilled in the art to which it appertains to construct and use the same, reference being had to the accompanying drawing, which is made part of this specification.

The invention consists of a washer made with a lip or projections, to be bent into a groove in the bolt, to prevent the rotation of the nut.

In the drawing, the figure shows a bolt and washer, the bolt having a longitudinal slot, into which a lip, $c^4$, of the washer $c$ is inserted, so as to prevent the rotation of the washer, the lip $c^5$ being adapted to be turned up against the side of the nut, so as to prevent its jarring loose.

The object of the invention, as has been stated, is to provide a means upon the washer for preventing its rotation when the nut is screwed down upon it, or of preventing the loosening of the nut after being screwed down upon it, the said means consisting of a lip or lips which are or may be bent so as to engage with a slot in the bolt, and one, if desired, to lap against the face or edge of the nut.

I might dwell upon the advantages of the device I have described, but suffice it to say that it is to give greater security to the bolt and nut by keeping the latter from jarring loose and the washer from rotating and defacing the surface upon which it is imposed.

Other incidental advantages might be mentioned were it necessary to a proper understanding of the nature and scope of the invention.

Having described my invention, what I claim therein as new, and desire to secure by Letters Patent, is—

Providing the washer with a lip or lips to be bent into a groove in the bolt, either with or without the lip $c^5$, to be bent against the side of the nut, according to the circumstances of the case, substantially as and for the purpose described.

The above specification of my invention signed this 22d day of December, 1865.

GIBBONS G. HICKMAN.

Witnesses:
JOHN A. WIEDERSHEIM,
JAS. L. EWIN.